Aug. 4, 1925.
C. H. SCOTT
1,548,333
PIPE COUPLING
Filed March 10, 1920
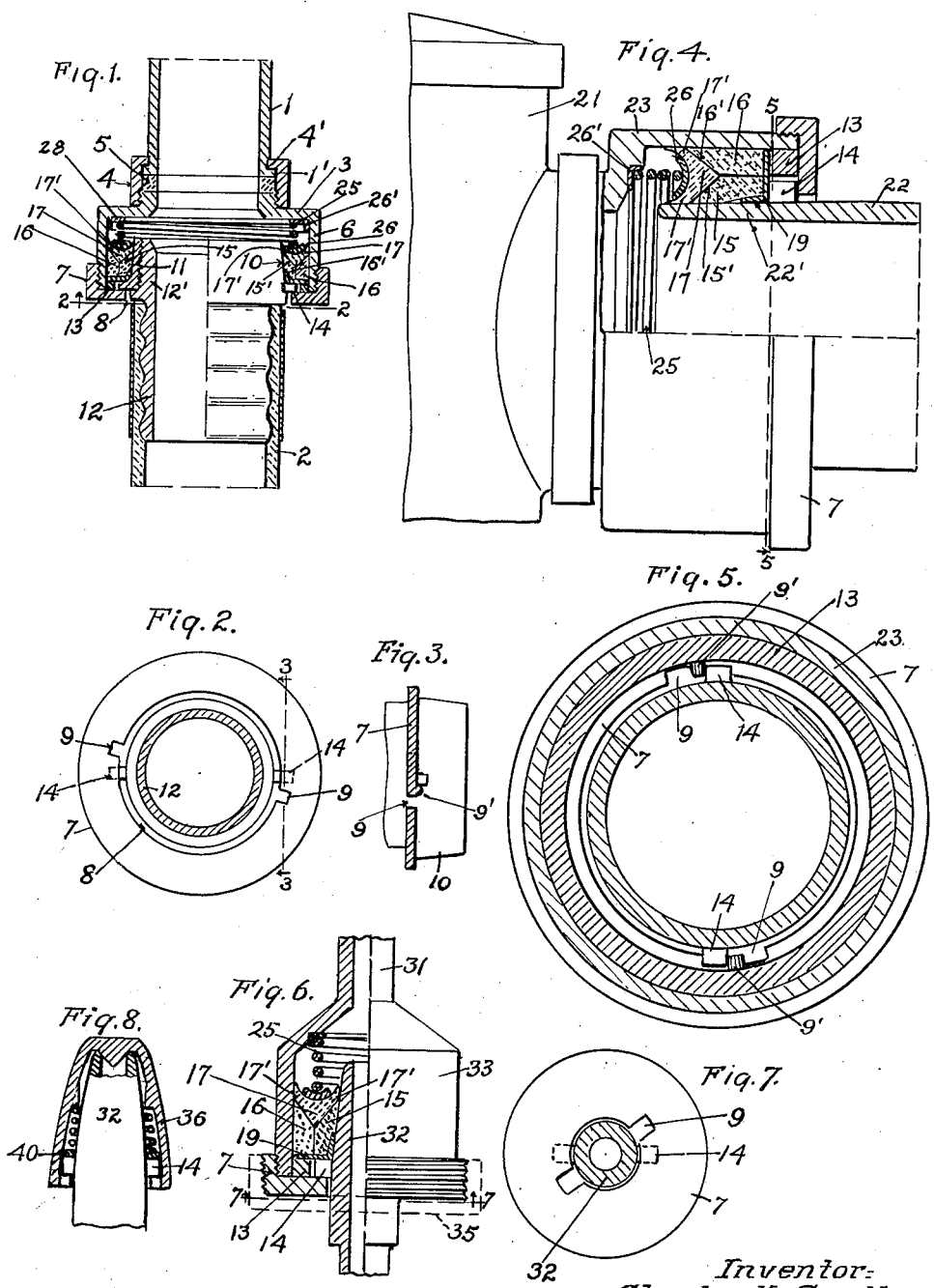
Inventor-
Charles H. Scott.
by Arthur P. Knight
Attorney Patented Aug. 4, 1925.

1,548,333

UNITED STATES PATENT OFFICE.

CHARLES H. SCOTT, OF SOUTH PASADENA, CALIFORNIA.

PIPE COUPLING.

Application filed March 10, 1920. Serial No. 364,689.

*To all whom it may concern:*

Be it known that I, CHARLES H. SCOTT, a citizen of the United States, residing at South Pasadena, in the county of Los Angeles and State of California, have invented a new and useful Pipe Coupling, of which the following is a specification.

This invention relates to means for coupling pipes, or hose, onto hydrants, pipes, or other fluid supply means, and the main object of the invention is to provide a coupling which can be quickly connected and separated and in which the pressure of the fluid will be operative to maintain a tight joint.

The accompanying drawings illustrate embodiments of my invention, and referring thereto:

Fig. 1 is a longitudinal section partly in elevation of one form of the invention especially adapted for attachment of a hose to a hydrant, the hose coupling member being shown partly in elevation;

Fig. 2 is a section on line 2—2 in Fig. 1;

Fig. 3 is a section on line 3—3 in Fig. 2;

Fig. 4 is a partly sectional elevation of a modified form of coupling for connecting a fire hose to a hydrant;

Fig. 5 is a section on line 5—5 in Fig 4;

Fig. 6 is a vertical section partly in elevation of a coupling for connecting a grease gun outlet tube to the part to be supplied with lubricant;

Fig. 7 is a section on line 7—7 in Fig. 6;

Fig. 8 is a vertical section partly in elevation showing the application of a protecting cap to the lubricant receiving member shown in Fig. 6.

In Fig. 1 portions of two fluid conducting members to be connected are indicated at 1 and 2, one of these members, for example, member 1, being a hydrant, and the other member 2 being a hose, or vice versa. A coupling socket member 3 is secured to the member 1, for example, by screwing in a ring 4 which is rotatably attached to member 1 by interengaging flanges 4' and 1' on members 4 and 1 in the usual manner of hose couplings, a rubber washer 5 being inserted between the parts 3 and 1 to make a tight joint. Said coupling member 3 has a cylindrical wall portion and a retaining ring 7 screws on the outer end of member 3 and is provided with a central opening 8 and with notches 9 extending radially from said opening.

A coupling nipple member is secured to fluid conducting member 2, being formed, for example, by screwing an adapter-brushing 11 on the usual screw nipple 12' of a hose coupling 12. Bushing 11 is adapted to pass through opening 8 in retaining ring 7 and to enter socket member 3, said bushing having preferably a conically tapering outer face 10 constituting a tapering nipple portion and forming the inner wall member for a packing joint and is provided with radially extending lugs 14 adapted to pass through the notches 9 aforesaid in retaining ring 7 and to engage with said retaining ring on slight relative rotation of said members, to hold the parts in position, a hump, or projection 9' being provided on retaining ring 7 adjacent each of the notches 9 over which the lugs 14 ride, so as to lock the parts against accidental uncoupling said lugs, in conjunction with the notched member 7, constitute a bayonet joint means for effecting connection of the nipple and socket members by a partial relative rotation of said members. A spacing washer 13 may be provided between retaining ring 7 and a packing member 15 to properly space the latter from the cap.

Packing means are provided between the members 3 and 11 of a yielding or expansible construction and adapted to be expanded by pressure of the fluid to ensure a tight joint, said packing means comprising, preferably, inner and outer rings 15 and 16 of cork, or other yielding material, and an expanding or sealing ring 17 of soft rubber, felt, leather, or other yielding material, having conical or divergently inclined inner and outer faces so as to act as a wedge-ring by engaging conical or inclined faces 15' and 16' on the members 15 and 16 to force said members into contact, respectively, with face 10 on member 11 and with the cylindrical wall 6 of member 3. Expanding or sealing ring 17 is preferably formed with flexible edge portions 17' which are inclined backward away from the member 2, so that the pressure of the fluid tends to press one of the flexible edge portions outward against the socket member and the other of said edge portions inward against the tapering nipple member thereby effectively sealing the joint. Increased pressure of the fluid which is delivered to the interior of the socket member beyond the joint of the nozzle and the socket member will cause tightening of the joint, in proportion to the increase of pressure so that leakage is effectively prevented, even at high pressure. The packing rings and sealing washer form a composite construction, which is conical on its face, and which contacts with the correspondingly conical nozzle member, thereby transmitting the longitudinal pressure of the fluid into lateral pressure on the nozzle member, producing a wedging action, which seals the joint and enables the packing to have the checking effect of a valve against the escape of fluid under pressure. A metal bushing 19 may be provided between members 15 and 16 and members 13 and 11 to protect the members 15 and 16 from wear. A coil spring 25 may be provided extending between washers 26 and 26', respectively engaging the washer 17 and a shoulder 28 on the member 3 to hold the packing means in proper position when the joints are disconnected and the fluid pressure is not effective thereon.

In attaching or connecting the coupling described above it is only necessary to push the member 10 into the member 3 and give a slight turn. The parts may thus be instantly connected and disconnected, and a tighter joint is secured, especially under high pressures, than is obtainable with the usual screw couplings.

Figs. 4 and 5 illustrate the application of my invention to a coupling for connecting the tapering nozzle 22' of a fire hose 22 to a socket 23 on a hydrant 21, the coupling parts being similar to the above described and similarly numbered and the construction and operation being the same as above described. In this particular application of the invention to a fire hose, the capability of instantaneous connection of the hose is of primary importance.

Figs. 6 and 8 illustrate the application of the invention to a coupling for connecting a socket member 33 on a grease gun outlet tube 31 to a tapering grease cup nozzle 32, the construction and operation being the same as described in connection with Figs. 4 and 5 and the coupling and packing parts being similarly numbered. When the parts are disconnected, the coupling member 33 may be protected by a screw cap indicated in dotted lines at 35 and the nozzle member 32 may be protected by a cap 36 secured thereon in any suitable manner, for example, by shoulders 39 on the cap engaging with lugs 14 on the nozzle and held in position by a spring pressed washer 40.

It will be understood that my invention is equally applicable to coupling pipes or hose for air, steam, or gas, as well as to pipes or hose for conducting liquids.

What I claim is:

1. A pipe coupling comprising a socket member, a nipple member adapted to enter within the socket member, said socket and nipple members being provided with bayonet joint means for connecting them, an expansible packing extending between said socket and nipple members and having flexible edge portions adapted to be forced by the pressure within the coupling, respectively outward against the socket member and inward against the nipple member to make a tight joint, retaining means on the socket member independent of the nipple member and cooperating with the socket member to form a housing for the expansible packing so as to retain said packing within said housing when the socket and nipple members are disconnected and a spring within the socket member and engaging the expansible packing to force the same into position to engage the nipple member when the socket and nipple members are connected.

2. A pipe coupling comprising a socket member, a nipple member adapted to enter within the socket member, said socket and nipple member being provided with bayonet joints means for connecting them, an expansible packing extending between said socket and nipple members and having flexible edge portions adapted to be forced by the pressure within the coupling, respectively outward against the socket member and inward against the nipple member to make a tight joint, a retaining ring detachably mounted on the socket member at the outer end thereof for retaining the expansible packing in place, and a spring within the socket member and engaging the expansible packing to force the same into position to engage the nipple member.

3. A pipe coupling comprising a socket member, elastic packing means within said socket member, a nipple member having a tapering portion extending within said packing means, said packing means having flexible edge portions adapted to be forced by the pressure within the coupling respectively outward against the socket member and inward against the nipple member, a spring within the socket member engaging the packing means to force it into position to engage the nipple member, retaining means on the socket member for retaining the packing means in place, and means on said socket and nipple members adapted to secure said members in connected position.

4. A pipe coupling comprising a socket member, elastic packing means within said socket member, a nipple member having a tapering portion extending within said packing means, said packing means having flexible edge portions adapted to be forced by the pressure within the coupling respectively outward against the socket member and inward against the nipple member, a spring within the socket member engaging the packing means to force it to position to engage the nipple member, a retaining ring detachably mounted on the socket member to retain the packing means in place and means on said socket and nipple members adapted to secure said members in connected position.

5. A pipe coupling comprising a socket member, a nipple member adapted to enter within the socket member, said members having interengaging means adapted to effect connection of the members by a partial rotation thereof, expansible packing means extending within said socket member and around said nipple member and comprising inner and outer rings of yielding material having diverging faces, and a wedge ring of yielding material adapted to engage said diverging faces to effect expansion of said inner and outer rings under the pressure of the fluid within the coupling.

6. A coupling, as set forth in claim 5, wherein said inner ring is conical on its inner face and said inner and outer rings and wedge ring cooperate to produce the checking effect of a valve against the escaping fluid contained under pressure.

7. A coupling, as set forth in claim 5, wherein said nipple is of conical shape corresponding to the contact surface produced by the combination of said inner ring and wedge ring, so that the longitudinal pressure of the fluid on said inner ring and wedge ring is converted into lateral pressure upon said nipple producing a wedging action for closing the joint.

8. A coupling, as set forth in claim 5, wherein said wedge ring is so formed that its edge portions are inclined backward and press, respectively, against the inner wall of said socket member and the outer wall of said nipple member, thus reinforcing the closing effect of said sealing ring when under pressure of fluid.

9. A coupling, as set forth in claim 5, and comprising, in addition, a spring between the wedge ring and the socket member whereby the respective members of the packing means are supported in position when not under pressure of fluid.

In testimony whereof I have hereunto subscribed my name this 3rd day of March, 1920.

CHARLES H. SCOTT.